United States Patent [19]

Williams

[11] Patent Number: 4,743,755

[45] Date of Patent: May 10, 1988

[54] METHOD AND APPARATUS FOR MEASURING AZIMUTH AND SPEED OF HORIZONTAL FLUID FLOW BY A BOREHOLE

[75] Inventor: Thomas M. Williams, Houston, Tex.

[73] Assignee: Texaco Inc., White Plains, N.Y.

[21] Appl. No.: 812,201

[22] Filed: Dec. 23, 1985

[51] Int. Cl.$^4$ .............................................. G01V 5/00
[52] U.S. Cl. .................................. 250/266; 250/270; 250/367
[58] Field of Search .............. 250/256, 266, 267, 270, 250/367

[56] References Cited

U.S. PATENT DOCUMENTS

| | | | |
|---|---|---|---|
| 3,013,156 | 12/1961 | Hearn | 250/256 |
| 3,539,806 | 11/1970 | Humphrey | 250/367 |
| 4,169,979 | 10/1979 | Arnold et al. | 250/266 |
| 4,228,350 | 10/1980 | Paap et al. | 250/267 |

Primary Examiner—Janice A. Howell
Attorney, Agent, or Firm—Robert A. Kulason; James J. O'Loughlin; Ronald G. Gillespie

[57] ABSTRACT

The present invention is a well logging apparatus and method for measuring the azimuth and speed of horizontal flow by a borehole using a conventional well logging sonde having a neutron source for irradiating the earthen formation surrounding the borehole. A gamma ray detection assembly in the sonde includes a segmented crystal and a segmented photomultiplier tube optically coupled to said segmented crystal. An additional gamma ray detector is located within the sonde and is displaced longitudinally along the sonde's longitudinal axis from the gamma ray detection assembly.

29 Claims, 2 Drawing Sheets

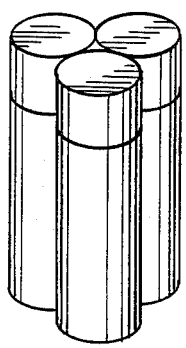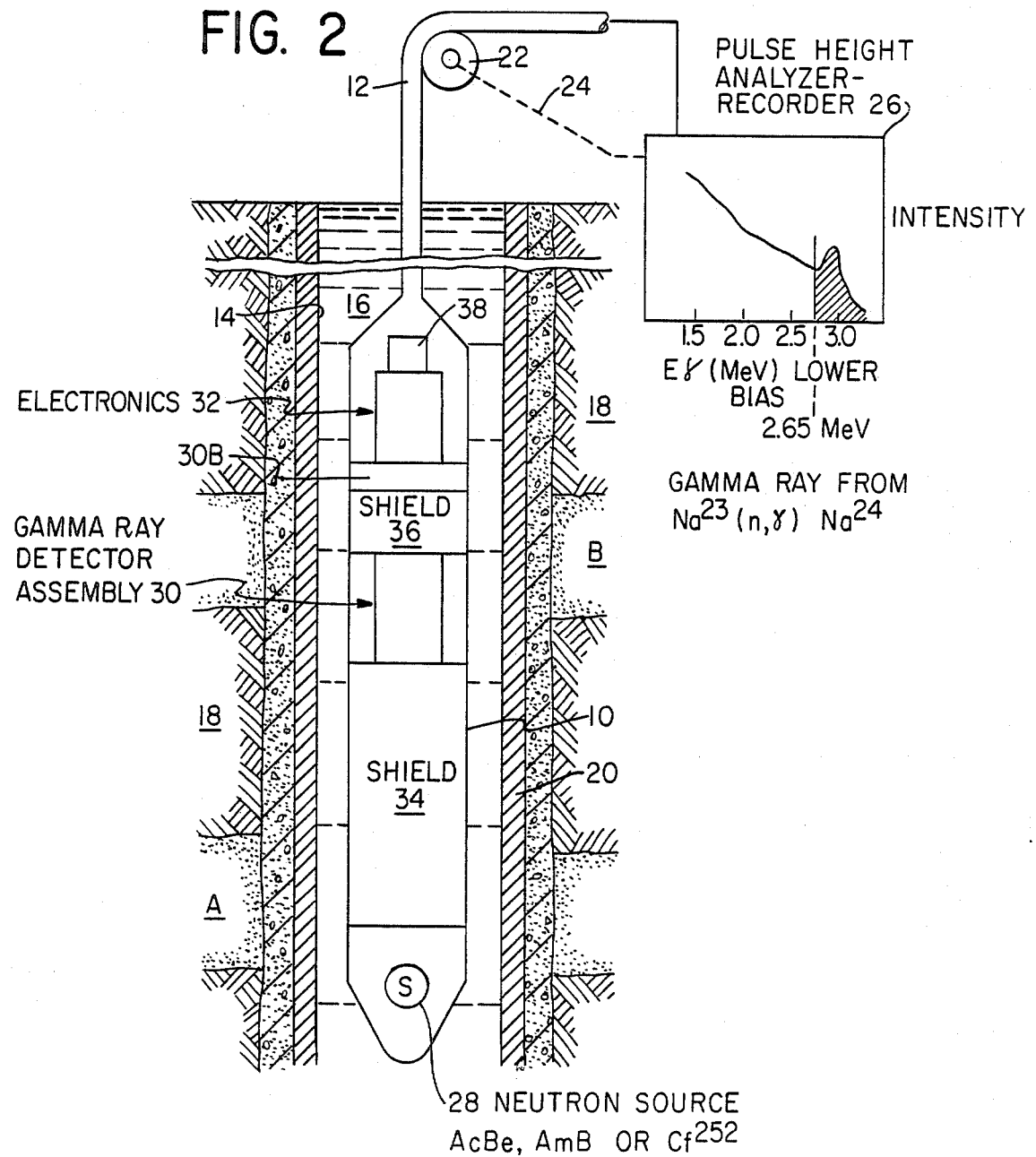

METHOD AND APPARATUS FOR MEASURING AZIMUTH AND SPEED OF HORIZONTAL FLUID FLOW BY A BOREHOLE

BACKGROUND OF THE INVENTION

Field of the Invention

The present invention relates to well logging in general and, more particularly, to radiation type well logging means and method.

SUMMARY OF THE INVENTION

The present invention is a well logging apparatus and method for measuring the azimuth and speed of horizontal flow by a borehole using a conventional well logging sonde having a neutron source for irradiating the earthen formation surrounding the borehole. A gamma ray detection assembly in the sonde includes a segmented crystal and a segmented photomultiplier tube optically coupled to said segmented crystal. An additional gamma ray detector is located within the sonde and is displaced longitudinally along the sonde's longitudinal axis from the gamma ray detection assembly.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 shows the prior art arrangement of three separate detector assemblies for the measuring of azimuth and speed of horizontal fluid flow by a borehole.

FIG. 2 is a simplified diagram of a well logging apparatus constructed in accordance with the present invention.

DESCRIPTION OF THE INVENTION

Figure 3:
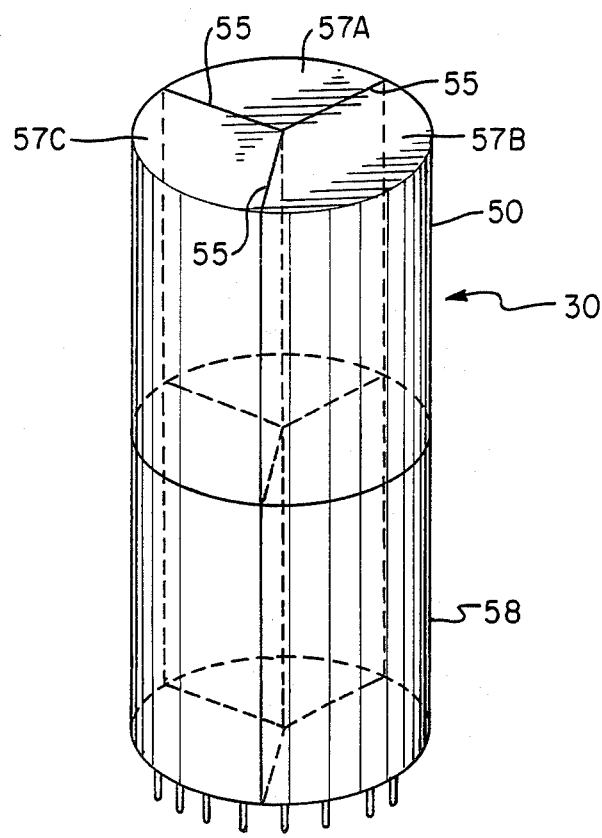
FIG. 3 is a graphical representation of a segmented detector assembly constructed in accordance with the present invention.

In the detection of behind casing water flow in a horizontal direction, earlier efforts were directed towards determining the azimuth direction of water flow such as in U.S. Pat. No. 4,169,979, assigned to Texaco Inc., assignee of the present invention, in which three detector assemblies were kept together as shown in FIG. 1. Later, in an attempt to improve the accuracy of that patent, another invention was made which is described and disclosed in U.S. Pat. No. 4,228,350, assigned to Texaco Inc., assignee of the present invention. In the latter mentioned patent, a collimated shield was rotated around the detector assembly and the angle of displacement of the collimated shield was used to determine the azimuth direction of the water flow. Although U.S. Pat. No. 4,228,350 represented an accuracy improvement over U.S. Pat. No. 4,169,979, it had the limitation of having a rotating electromechanical device downhole which would be more inclined to failure than a purely electronic device.

The present invention represents an improvement over both of those patents by using a segmented crystal instead of three separate crystals as is required in U.S. Pat. No. 4,169,979 to achieve better angular resolution. Further, the total counts are higher for the present invention than the system and method of U.S. Pat. No. 4,169,979 thereby improving the statistical accuracy. The U.S. Pat. No. 4,169,979 patent is hereby incorporated into the present application.

With reference to FIG. 2, a downhole sonde 10 is shown suspended by a well logging cable 12 in a well borehole 14 which is filled with borehole fluid 16 and surrounded by earth formations 18. The well 14 may be lined with casing 20 cemented in place as shown. The cable 12 passes over a sheave 22 which is mechanically or electrically linked, as indicated by the dotted line 24, to a recorder 26 so that measurements from the downhole sonde 10 may be recorded as a function of depth in the well borehole 14. A neutron source 28 is positioned within the lower end of the sonde 10 for use in radiating formation fluid. The source 28 may be a continuous chemical neutron source such as an actinium berylium source, or a californium 252 source.

Toward the opposite end of the sonde 10 from the source 28 is a gamma ray detector assembly 30. Detector assembly 30, which will be described in detail hereinafter, provides three streams of pulses. The pulse streams from detector assembly 30 may be received by appropriate information processing equipment included in an electronic package 32 positioned toward the top of the sonde 10. Thus, three sets of pulse streams from the detector assembly may be multiplexed or similarly encoded by transmission schemes conventional in the art to provide for transmission along a conductor within the logging cable 12 to the well surface. At the surface the unified signal is demultiplexed or decoded with the three data pulse streams separated and identified with the corresponding component of detector assembly 30 for further data reduction as described hereinafter. Further, the multiplexed signal may also be processed to provide a total count for detector assembly 30. It will also be appreciated that appropriate power sources (not shown) may be provided at the surface and connected to the downhole electronic equipment in the package 32 by appropriate conductors within the logging cable 12 in order to supply operational power for the electronic package as well as the detector assembly 30. As an alternative, power supplies may be included within the electronic package 32. Details of such power supply arrangements and appropriate couplings are not illustrated, as these are conventional in the art.

The space between the neutron source 28 and the detector assembly 30 in the downhole sonde 10 is occupied by shielding material 34 of suitable type to prevent direct irradiation of the crystal component of detector assembly 30 with high energy neutrons from the neutron source. Shielding materials with high hydrogen content, such as paraffin or other polymolecular hydrocarbon structure, may be utilized for this purpose. The high hydrogen content serves to slow down or rapidly attenuate the neutron population from the neutron source, and prevent this thermalized neutron population from reaching the vicinity of the detector crystals. To this end, strong thermal neutron absorbers such as cadmium may be interposed in layers with the hydrogenate shielding material in order to make up the shield portion 34. Additional shielding 36 may be positioned between the detector assembly 30 and the electronic package 32 to further protect the latter and to provide a horizontal "focussing" effect to the detector response.

The present invention employs the downhole production of radioactive isotopes within the formation fluids in the vicinity of the well borehole 14. For example, the radiation of water in the vicinity of the borehole with high energy neutrons having energy in excess of approximately 10 MEV can result in the creation of the radioactive isotope nitrogen 16 by the nuclear reaction $O^{16}(n,p)N^{16}$. If the formation fluid is saline in nature, the radioactive isotope sodium 24 can be produced by radiating the earth formation with neutrons which are slowed to thermal energy and captured by the more common isotope sodium 23 comprising NaCl in solution according to the nuclear reaction $Na^{23}(n,\tau)Na^{24}$. The sodium 24 isotope then decays by the emission of gamma radiation of 2.75 MEV energy. Thus, the detector assembly 30 detects the presence and intensity of such gamma emission.

The pulse streams from the detectors may be passed through a downhole comparator appropriately biased to reject all voltage pulses of height corresponding to gamma rays of less than 2.65 MEV before the information signals are carried to the surface. A pulse height analyzer incorporated with the recorder 26 at the surface, for use in data reduction as described hereinafter, may also be used to reject voltage pulses corresponding to gamma radiation of less than 2.65 MEV.

Where the neutron bombardment occurs in limestone formations, calcium is also formed, and emits 3.09 MEV gamma rays. However, since the half life of calcium is approximately nine minutes, the effect of this isotope may be avoided if radiation measurements are delayed even a short time from the end of the irradiation time interval. All other significant quantities of naturally occurring gamma rays from radioactive isotopes which may be produced in earth formations using the chemical type neutron source 28 have characteristic energies below 2.65 MEV. Thus, by use of the 2.65 MEV threshold, the radiation detected and counted may be limited, for practical purposes, to that generated by the decay of the unstable radioactive isotope sodium 24.

The sonde 10 is also equipped with a gyrocompass device 38 of the type known in the art for use in directional drilling surveys. The purpose of the gyrocompass 38 is to identify the orientation of the sonde 10 and, therefore, the detector assembly 30 with respect to a reference direction such as North when gamma ray count data is being acquired. Since the present invention will most generally be used in wells which are cased with steel casing, a conventional magnetic compass would not be appropriate for this purpose.

With reference to FIG. 3 detector assembly 30 includes a segmented detector 50 which may be by way of example, a sodium iodide, thallium-activated scintillation crystal. As shown in FIG. 3, crystal 50 is divided into three segments by separators 55. It could be segmented into four segments but three is preferred. Physically attached to crystal 50 is a segmented photomultiplier tube 58. Segmented photomultiplier tube 50 is segmented into three segments aligned with segments of crystal 50. Photomultiplier tube 50 may have one anode and cathode but separate dynodes and multiplying plates for each segment.

Of course one need not use a segmented photomultiplier tube. An arrangement of three multiplier tubes spatially arranged with the segments of crystal 50 may also be used. However that would result in losing some energy resolution which must be taken into consideration in the utilization of the present invention.

Figure 4:
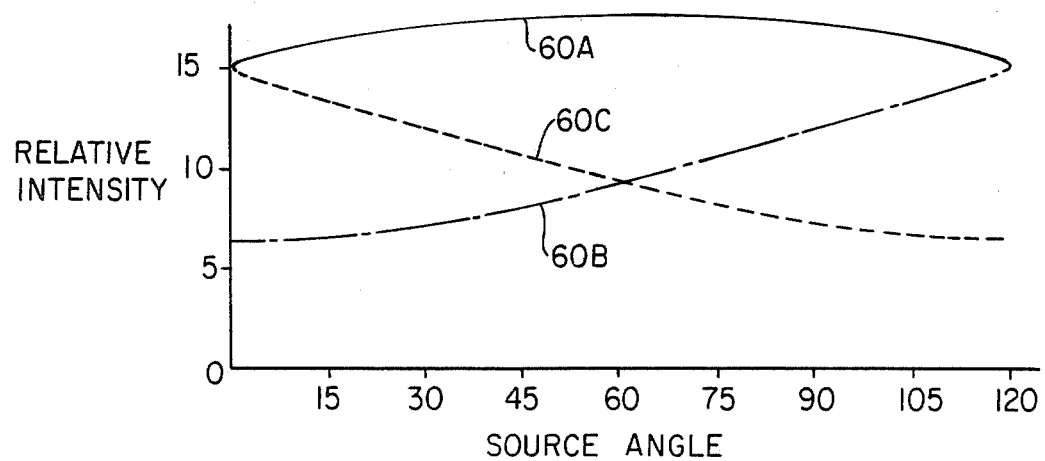
FIG. 4 is a graphical representation of the three intensity levels of the outputs of the detector assembly in FIG. 3 for a point source moving past one segment of the detector assembly.

With reference to FIG. 4, there is shown the directionalism of the detector assembly by showing the outputs 60A, 60B and 60C from photomultiplier tube 58 which is associated with detector segments 57A, 57B and 57C, respectively for a point source moving past segment 57A of crystal detector 50. Thus, at an angle of zero degrees, 60A and 60B have the same relative energy level, while signal 60C represents much lower energy level. At angle 60, point source is half way around one segment 57A and signals 60B and 60C are just about equal and considerably less than signal 60A. As the point source reaches angle 120°, signals 60A and 60C have relatively the same energy level while signal 60B is down at its low point. Obviously as the point source continues around the detector assembly, FIG. 4 could be repeated for each segment, different lines being in different positions until the point has traveled around detector 50.

As in U.S. Pat. No. 4,169,979, the counts of detector assembly 30 may be added together for analysis of the speed of fluid flow or an additional lone detector, having a scintillation crystal and photomultiplier tube, may be provided in sonde 10 for this purpose.

The present invention as hereinbefore described is a behind casing water flow well logging system and method with an improved capability to determine the azimuth of the water flow.

What is claimed is:

1. Well logging apparatus comprising:
   a sonde;
   a neutron source within said sonde;
   a gamma ray detection assembly within said sonde, said gamma ray detection assembly includes
   a segmented scintillation crystal, and
   a segmented photomultiplier tube optically coupled to said segmented crystal, and said gamma ray detection assembly being displaced from said neutron source longitudinally along said sonde with the segments of the crystal and the photomultiplier tube being disposed symmetrically about the longitudinal axis of said sonde; and
   an additional gamma ray detector within said sonde displaced longitudinally along said sonde from said gamma ray detection assembly and said neutron source and disposed generally along the longitudinal axis of said sonde.

2. Well logging apparatus as defined in claim 1 further comprising:
   data reduction means for processing gamma ray count information from said gamma ray detection assembly and said gamma ray detector.

3. Well logging apparatus as defined in claim 2 wherein said data reduction means comprises:
   means for analyzing said gamma ray count information according to the energy of gamma rays counted; and
   means for limiting the processing of gamma ray count information to that corresponding to gamma rays within a selected energy range.

4. Well logging apparatus as defined in claim 3 wherein said data reduction means further comprises:
   means for encoding data ray count information signals from said gamma ray detectors for transmission to the surface.

5. Well logging apparatus as defined in claim 4 further comprising:
   shielding means within said sonde, positioned between said neutron source and said gamma ray detection assembly.

6. Well logging apparatus as defined in claim 5 further comprising:
   direction indicating means for identifying the direction of orientation of said gamma ray detection assembly.

7. Well logging apparatus as defined in claim 6 wherein said direction indicating means comprises:
   a gyrocompass.

8. Well logging apparatus as defined in claim 1 further comprising:
   shielding means within said sonde positioned between said neutron source and said gamma ray detection assembly.

9. Well logging apparatus as defined in claim 1 further comprising:
   direction indication means for identifying the direction of orientation of said gamma ray detection assembly.

10. Well logging apparatus as defined in claim 9 wherein said direction indication means comprises:
    a gyrocompass.

11. A method for determining the characteristics of flow of earth formation fluid, moving in a horizontal direction past a borehole, comprising the steps of:
    irradiating the formation fluid with neutrons from a neutron source positioned within the borehole;
    providing a detector assembly of a segmented crystal detector and a segmented photomultiplier tube optically coupled to said detector,
    exposing said segmented detector to radiation from the neutron-irradiated formation fluid by positioning said detector within said borehole at the level of said formation fluid to acquire count rate data from each detector; and
    comparing said count rate data from said segmented photomultiplier tube to determine the direction of movement of said fluid past said borehole during the time between said neutron-irradiation and said acquisition of count rate data.

12. A method as defined in claim 11 wherein the step of exposing said segmented detector to radiation from the neutron-irradiated formation fluid is accomplished by moving said segmented detector and said photomultiplier tube along said borehole through the area of the irradiated formation fluid while said separated detector and said segmented photomultiplier tube are operational to so acquire said count rate data.

13. A method as defined in claim 12 further comprising the additional step of analyzing said gamma ray count data according to the energy of gamma rays counted.

14. A method as defined in claim 13 further comprising the additional step of limiting the comparing of said gamma ray count data to that corresponding to gamma rays within a selected energy range.

15. A method as defined in claim 14 wherein the step of irradiating said formation fluid effects production of the isotope sodium 24 in said formation fluid.

16. A method as defined in claim 14 wherein the step of irradiating said formation fluid effects production of the isotope nitrogen 16 in said formation fluid.

17. A method as defined in claim 11 further comprising the additional steps of:
    providing means for identifying the direction of orientation of said detector assembly relative to said borehole; and
    so determining the direction of movement of said fluid by identifying said direction of movement relative to said detector assembly and, therefore, relative to said borehole.

18. A method as defined in claim 11 further comprising the additional steps of:
    exposing said segmented detector to radiation from said neutron-irradiation formation fluid a second time to acquire second count rate data; and
    combining count rate data from both said exposures according to a predetermined relationship to determine the flow speed of said formation fluid past said borehole.

19. A method as defined in claim 18 further comprising the additional step of analyzing said gamma ray count data according to the energy of gamma rays counted.

20. A method as defined in claim 19 further comprising the additional step of limiting the comparing of said gamma ray count data to that corresponding to gamma rays within a selected energy range.

21. A method as defined in claim 20 wherein the step of irradiating said formation fluid effects production of the isotope sodium 24 in said formation fluid.

22. A method as defined in claim 20 wherein the step of irradiating said formation fluid effects production of the isotope nitrogen 16 in said formation fluid.

23. A method as defined in claim 18 wherein the steps of exposing said detectors to radiation from the neutron-irradiated formation fluid are accomplished by moving said detector assembly along said borehole through the area of the irradiated formation fluid while said detector assembly is operational to so acquire said count rate data.

24. A method as defined in claim 18 further comprising the additional steps of:
    providing means for identifying the direction of orientation of said detector assembly relative to said borehole; and
    so determining the direction of movement of said fluid by identifying said direction of movement relative to said detector assembly and, therefore, relative to said borehole.

25. A method as defined in claim 11 further comprising the additional steps of:
    providing an additional gamma ray detector;
    moving said additional gamma ray detector along said borehole through the area of the irradiated formation fluid to acquire first additional count rate data;
    waiting a selected length of time and then again moving said additional gamma ray detector through said area for acquiring second additional count rate data; and
    combining said first and second additional count rate data according to a predetermined relationship to determine flow speed of said formation fluid past said borehole.

26. A method as defined in claim 25 further comprising the additional step of analyzing said gamma ray count data according to the energy of gamma rays counted.

27. A method as defined in claim 26 further comprising the additional step of limiting the comparing of said gamma ray count data to that corresponding to gamma rays within a selected energy range.

28. A method as defined in claim 27 wherein the step of irradiating said formation fluid effects production of the isotope sodium 24 in said formation fluid.

29. A method as defined in claim 27 wherein the step of irradiating said formation fluid effects production of the isotope nitrogen 16 in said formation fluid.

* * * * *